(12) United States Patent
Baset et al.

(10) Patent No.: US 10,223,329 B2
(45) Date of Patent: Mar. 5, 2019

(54) POLICY BASED DATA COLLECTION, PROCESSING, AND NEGOTIATION FOR ANALYTICS

(71) Applicant: International Business Machines Corporation, Armonk, NY (US)

(72) Inventors: Salman A. Baset, New York, NY (US); Yu Deng, Yorktown Heights, NY (US); Minkyong Kim, Scarsdale, NY (US); Alla Segal, Mount Kisco, NY (US); Charles O. Schulz, Ridgefield, CT (US); Anca Sailer, Scarsdale, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 14/664,225

(22) Filed: Mar. 20, 2015

(65) Prior Publication Data
US 2016/0275158 A1    Sep. 22, 2016

(51) Int. Cl.
*G06F 17/30* (2006.01)
*G06F 16/248* (2019.01)
*G06F 16/36* (2019.01)

(52) U.S. Cl.
CPC .......... *G06F 16/248* (2019.01); *G06F 16/367* (2019.01)

(58) Field of Classification Search
CPC ............... G06F 17/30554; G06F 17/30734
See application file for complete search history.

(56) References Cited

U.S. PATENT DOCUMENTS

| 7,349,896 B2 * | 3/2008 | Chowdhury ...... G06F 17/30675 707/E17.075 |
| 7,890,517 B2 | 2/2011 | Angelo et al. |
| 8,126,762 B2 | 2/2012 | Ramachandran et al. |

(Continued)

OTHER PUBLICATIONS

Azvine, et al., "Real Time Business Intelligence for the Adaptive Enterprise", Proceedings of the 8th IEEE International Conference on E-Commerce Technology and the 3rd IEEE International Conference on Enterprise Computing, E-Commerce, and E-Services (CEC/EEE'06), © 2006.

(Continued)

*Primary Examiner* — Ashish Thomas
*Assistant Examiner* — Jedidiah P Ferrer
(74) *Attorney, Agent, or Firm* — Alexander G. Jochym

(57) ABSTRACT

An approach for ontological policy based data collection, processing, and negotiation for data in view of analytics is provided. The approach searches one or more data sources for data related to a data request. The approach collects data related to the data request from the one or more data sources. The approach determines whether one or more attributes generated from the data request match one or more descriptors associated with the data related to the data request. The approach creates one or more annotated ontologies for the data related to the data request. The approach displays a hierarchical visualization of the one or more annotated ontologies for the data related to the data request. The approach updates the one or more annotated ontologies for the data related to the data request based, at least in part, on an evaluation of the quality of the one or more data selections.

16 Claims, 7 Drawing Sheets

(56) References Cited

U.S. PATENT DOCUMENTS

| | | | |
|---|---|---|---|
| 8,214,401 B2* | 7/2012 | Rao | G06F 17/30734 |
| | | | 707/794 |
| 8,719,207 B2 | 5/2014 | Ratnam et al. | |
| 8,874,552 B2* | 10/2014 | Jehuda | G06F 17/30734 |
| | | | 707/722 |
| 9,098,803 B1 | 8/2015 | Todd et al. | |
| 9,747,390 B2* | 8/2017 | Cooper | G06F 17/30979 |
| 2003/0172368 A1 | 9/2003 | Alumbaugh et al. | |
| 2006/0053382 A1* | 3/2006 | Gardner | G06F 17/30734 |
| | | | 707/E17.099 |
| 2006/0167704 A1 | 7/2006 | Nicholls et al. | |
| 2007/0174270 A1* | 7/2007 | Goodwin | G06F 17/30705 |
| | | | 707/999.005 |
| 2012/0179642 A1 | 7/2012 | Sweeney | |
| 2013/0007124 A1* | 1/2013 | Sweeney | G06F 17/30734 |
| | | | 709/204 |
| 2014/0337772 A1 | 11/2014 | Cervelli et al. | |
| 2015/0127607 A1* | 5/2015 | Savage | G06F 17/30194 |
| | | | 707/610 |
| 2016/0070758 A1 | 3/2016 | Thomson et al. | |

OTHER PUBLICATIONS

Costello, et al., "Towards a Semantic Framework for Business Activity Monitoring and Management", Association for the Advancement of Artificial Intelligence, © 2008.

Emrich, et al., "Enabling Cross-Application Traceability of Semi-structured Business Processes", M. zur Muelen and J. Su (Eds.): BPM 2010 Workshops, LNBIP 66, pp. 625-633, 2011, © Springer-Verlag Berlin Heidelberg 2011.

Pedrinaci, et al., "A Core Ontology for Business Process Analysis", In: The 5th Annual European Semantic Web Conference (ESWC 2008), Jun. 1-5, 2008, pp. 49-64, © 2008 The Authors.

* cited by examiner

US 10,223,329 B2

POLICY BASED DATA COLLECTION, PROCESSING, AND NEGOTIATION FOR ANALYTICS

BACKGROUND OF THE INVENTION

The present invention relates generally to data analytics, and more particularly to data collection, data processing, and negotiation for data in view of analytics based on ontological policies.

Ontology is a model for describing a world that consists of a set of types, properties, and relationships. Ontologies can represent entities, ideas, and events, along with their properties and relationships, according to a system of categories.

Domain ontology (i.e., domain-specific ontology) represents concepts that belong to part of the world. Particular meanings of terms applied to a domain are provided by domain ontology. For example, the word "card" has many different meanings. Ontology about the domain of poker may model the "playing card" meaning of the word "card", whereas ontology about the domain of computer hardware may model the "video card" meaning of the word "card".

Since domain ontologies represent concepts in a very specific and often eclectic way, they are often incompatible. As systems that rely on domain ontologies expand, they often need to merge domain ontologies into a more general representation. This presents a challenge to the ontology designer. Different ontologies in the same domain arise due to different languages, different intended usage of the ontologies, and different perceptions of the domain (based on cultural background, education, ideology, etc.).

SUMMARY

Aspects of an embodiment of the present invention disclose a method, system, and computer program product for ontological policy based data collection, processing, and negotiation for data in view of analytics. The method includes searching, by one or more computer processors, one or more data sources for data related to a data request. The method includes collecting, by one or more computer processors, data related to the data request from the one or more data sources. The method includes determining, by one or more computer processors, whether one or more attributes generated from the data request match one or more descriptors associated with the data related to the data request. Responsive to a determination that the one or more attributes generated from the data request match one or more descriptors associated with the data related to the data request, the method includes creating, by one or more computer processors, one or more annotated ontologies for the data related to the data request. The method includes displaying, by one or more computer processors, a hierarchical visualization of the one or more annotated ontologies for the data related to the data request. The method includes updating, by one or more computer processors, the one or more annotated ontologies for the data related to the data request based, at least in part, on an evaluation of the quality of the one or more data selections.

DETAILED DESCRIPTION

Embodiments of the present invention recognize that cloud data collection has limited capabilities with respect to the proper identification and selection of data for streaming, and as such, data providers often restrict data flow beyond a point of usefulness for relevant analytics. Embodiments of the present invention further recognize that smart tagging and fine granularity selection of data provides opportunities for data selection, data collection, and data negotiation between a data provider and a data consumer.

Embodiments of the present invention provide the capability to support a data provider with off-line policy based data auto-tagging and on-line fine granularity data tagging in view of custom data selection and data collection based on negotiations between the data provider and a data consumer. Embodiments of the present invention provide the capability to preprocess data in view of relevant analytics based on source preview data and ontological polices related to the relevant analytics. Embodiments of the present invention provide a hierarchical visualization of the ontology to allow the data consumer to investigate and select data related to the relevant analytics. Embodiments of the present invention provide the capability to notify the data provider of data requests to additionally manually configure the ontological polices. Embodiments of the present invention provide the capability for a data consumer to evaluate the quality of a particular data provider's data.

Implementation of such embodiments may take a variety of forms, and exemplary implementation details are discussed subsequently with reference to the Figures.

Figure 1:
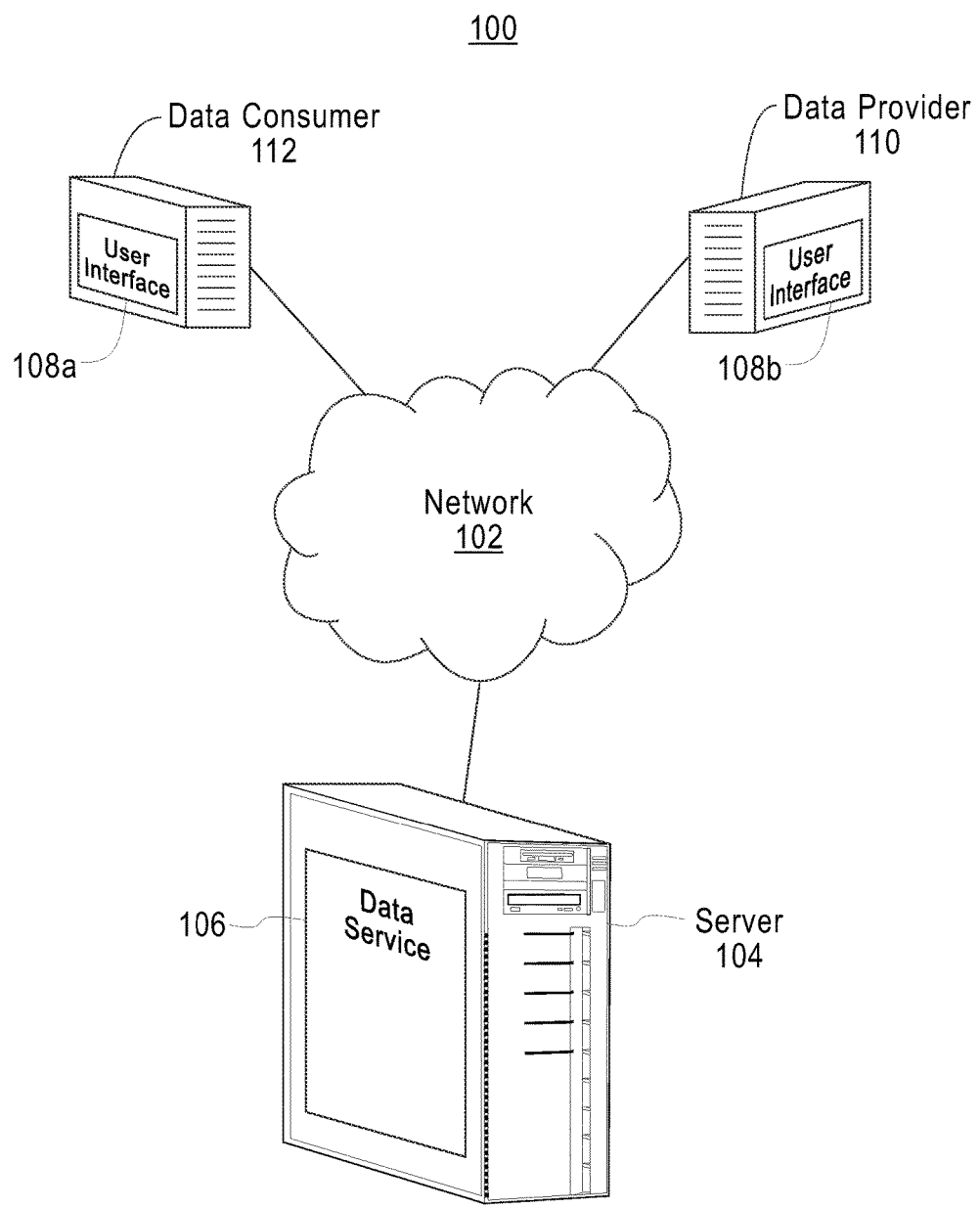
FIG. 1 is a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, data provider 110, and data consumer 112.

In the exemplary embodiment, server 104 may be, for example, a server computer system such as a management server, web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes a data service 106.

In the exemplary embodiment, data provider 110 may be, for example, a server computer system such as a management server, web server, or any other electronic device or computing system capable of sending and receiving data. In another embodiment, data provider 110 may be a data center, consisting of a collection of networks and servers providing an IT service, such as virtual servers and applications deployed on virtual servers, to an external party. In another embodiment, data provider 110 represents a "cloud" of computers interconnected by one or more networks, where data provider 110 is a computing system utilizing clustered computers and components to act as a single pool of seamless resources when accessed through network 102. This is a common implementation for data centers in addition to cloud computing applications. In the exemplary embodiment, data provider 110 includes user interface 108(b). In the exemplary embodiment, user interface 108(b) is a conventional user interface for providing capability to a user of data provider 110 for communicating with one or more electronic devices. In one embodiment, data provider 110 may communicate with data service 106 via a user interface, such as user interface 108(b). In the exemplary embodiment, data provider 110 sends data, such as ticket data of a cloud system, to data service 106 for collection and processing for analytics.

In the exemplary embodiment, data consumer 112 may be, for example, a server computer system such as a management server, web server, or any other electronic device or computing system capable of sending and receiving data. In another embodiment, data consumer 112 may be a data center, consisting of a collection of networks and servers providing an IT service, such as virtual servers and applications deployed on virtual servers, to an external party. In another embodiment, data consumer 112 represents a "cloud" of computers interconnected by one or more networks, where data consumer 112 is a computing system utilizing clustered computers and components to act as a single pool of seamless resources when accessed through network 102. This is a common implementation for data centers in addition to cloud computing applications. In the exemplary embodiment, data consumer 112 includes user interface 108(a). In the exemplary embodiment, user interface 108(a) is a conventional user interface for interacting with one or more electronic devices. In the exemplary embodiment, data consumer 112 requests specific data and evaluates the quality of data provided for an analytic solution from data service 106 via a user interface, such as user interface 108(a).

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, data service 106, data provider 110, and data consumer 112 are interconnected by network 102. Network 102 can be any combination of connections and protocols capable of supporting communications between server 104, data service 106, data provider 110, and data consumer 112. Network 102 may also be implemented as a number of different types of networks, such as an intranet, a local area network (LAN), a virtual local area network (VLAN), or a wide area network (WAN).

In the exemplary embodiment, data service 106 is a software-based component capable of preprocessing data with respect to analytics at a source level (i.e., source preview data from a data provider) and a destination level (i.e., policies related to analytics requirements of a data consumer). In the exemplary embodiment, data service 106 supports a data provider, such as data provider 110, with off-line policy based data auto-tagging and on-line fine granularity data tagging in view of custom data selection and data collection based on negotiation between a data provider and data consumer, such as data provider 110 and data consumer 112. In the exemplary embodiment, data service 106 generates a hierarchical visualization of an ontology related to a data request, allowing a data consumer, such as data consumer 112, to investigate and select pertinent data for a particular analytic solution via a user interface, such as user interface 108(a). In the exemplary embodiment, data service 106 provides the capability to notify a data provider, such as data provider 110, of a specific data request to allow the data provider to manually configure an ontology related to the data request via a user interface, such as user interface 108(b). In the exemplary embodiment, data service 106 provides the capability to a data consumer, such as data consumer 112, for evaluating various aspects of a particular data provider, such as data provider 110, including, but not limited to, evaluating qualitative value of provider data via a user interface, such as user interface 108(a). In the exemplary embodiment, data service 106 utilizes historical data from past policies and how provider data was used to update ontological policies.

Figure 2:
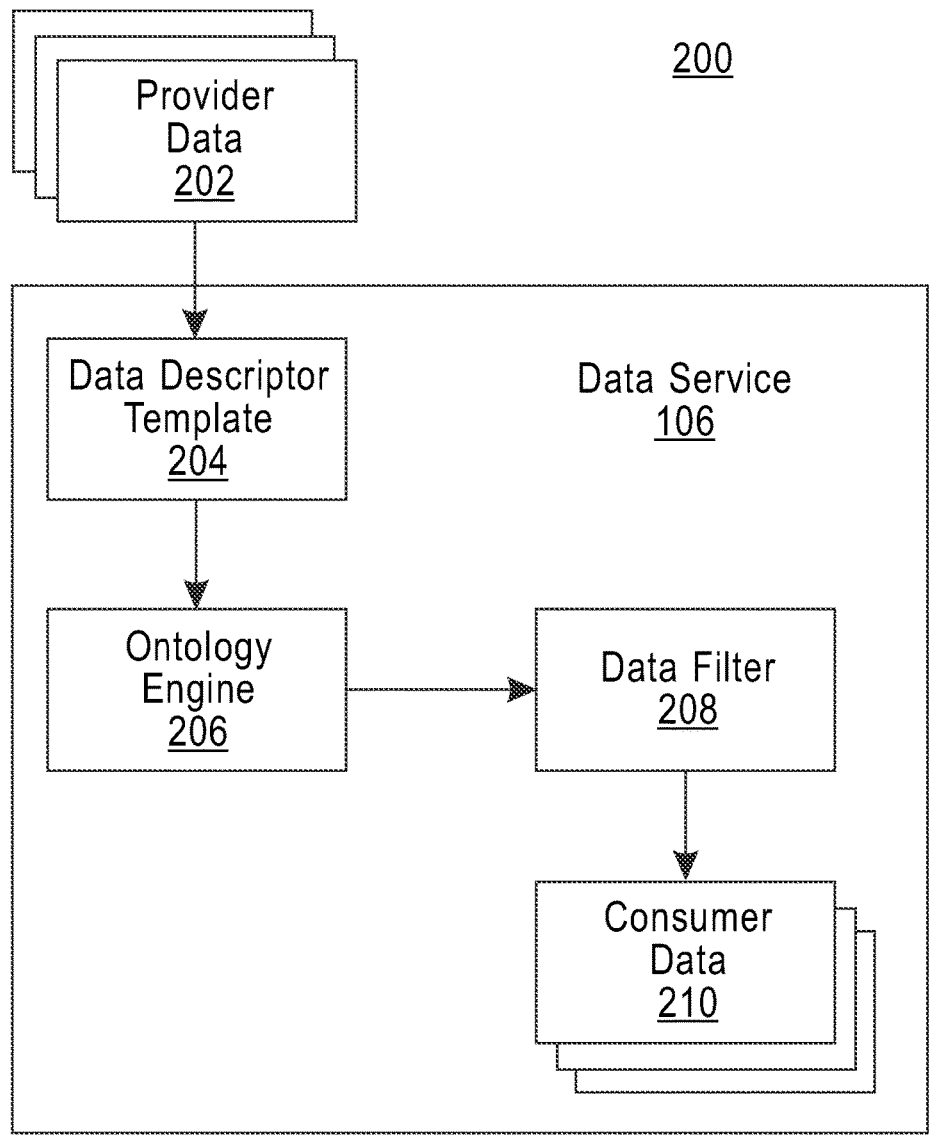
FIG. 2 a flow diagram depicting an exemplary process flow of a data service, generally designated 200, for policy based data collection, processing, and negotiation for analytics, in accordance with an embodiment of the present invention.

FIG. 2 a flow diagram depicting an exemplary process flow of a data service, such as data service 106 in FIG. 1, generally designated 200, for policy based data collection, processing, and negotiation for analytics, in accordance with an embodiment of the present invention.

In the exemplary embodiment, data service 106 collects provider data 202. In the exemplary embodiment, data service 106 collects provider data 202 from one or more data sources, such as data provider 110, where provider data 202 is a plurality of input data including, without limitation, big data, server data, log data, web forum data, deployment recipes, Computer Emergency Readiness Team (CERT) bulletins, documents, spreadsheets, comma-separated values (CSV) files, JavaScript® object notation (JSON), and extensible markup language (XML), etc., made available by a data provider, such as data provider 110. In one embodiment, data service 106 may collect provider data 202 from one or more data sources actively, for example, by extracting input data from a data stream. In another embodiment, data service 106 may collect provider data 202 from one or more data sources passively, for example, by receiving input data from the one or more data sources directly. For example, data service 106 may collect log data made available by a data provider via a data stream. In another embodiment, data service 106 receives provider data 202 from a data provider, such as data provider 110.

In the exemplary embodiment, data service 106 populates data descriptor template 204. In the exemplary embodiment, data descriptor template 204 is a configurable data descriptor template including one or more ontological descriptors defining a particular domain.

In the exemplary embodiment, data service 106 utilizes ontology engine 206 to create one or more annotated ontologies for the provider data 202. Data service 106 utilizes ontology engine 206 to associate data descriptors, ontology descriptors, and relevant user defined data policy rules to create one or more ontologies for describing the data and its various handling requirements. For example, in an information technology (IT) configuration domain, where a user defined data policy states "If IP belongs to Company A, and Password not compliant, then add Logs", data service 106 will create one or more ontologies with preferred labels, such as "password", and its related data, with "worklogs", and its related data. Aspects of data service 106 and ontology engine 206 are discussed in further detail in subsequent Figures.

Data service 106 utilizes data filter 208 to clean data from the relevant one or more ontologies and ensure the data conforms to user defined data policy rules. Upon completion of data filtering, consumer data 210 is made available to a data consumer, such as data consumer 112. Aspects of data service 106 and data filter 208 are discussed in further detail in subsequent Figures.

Figure 3:
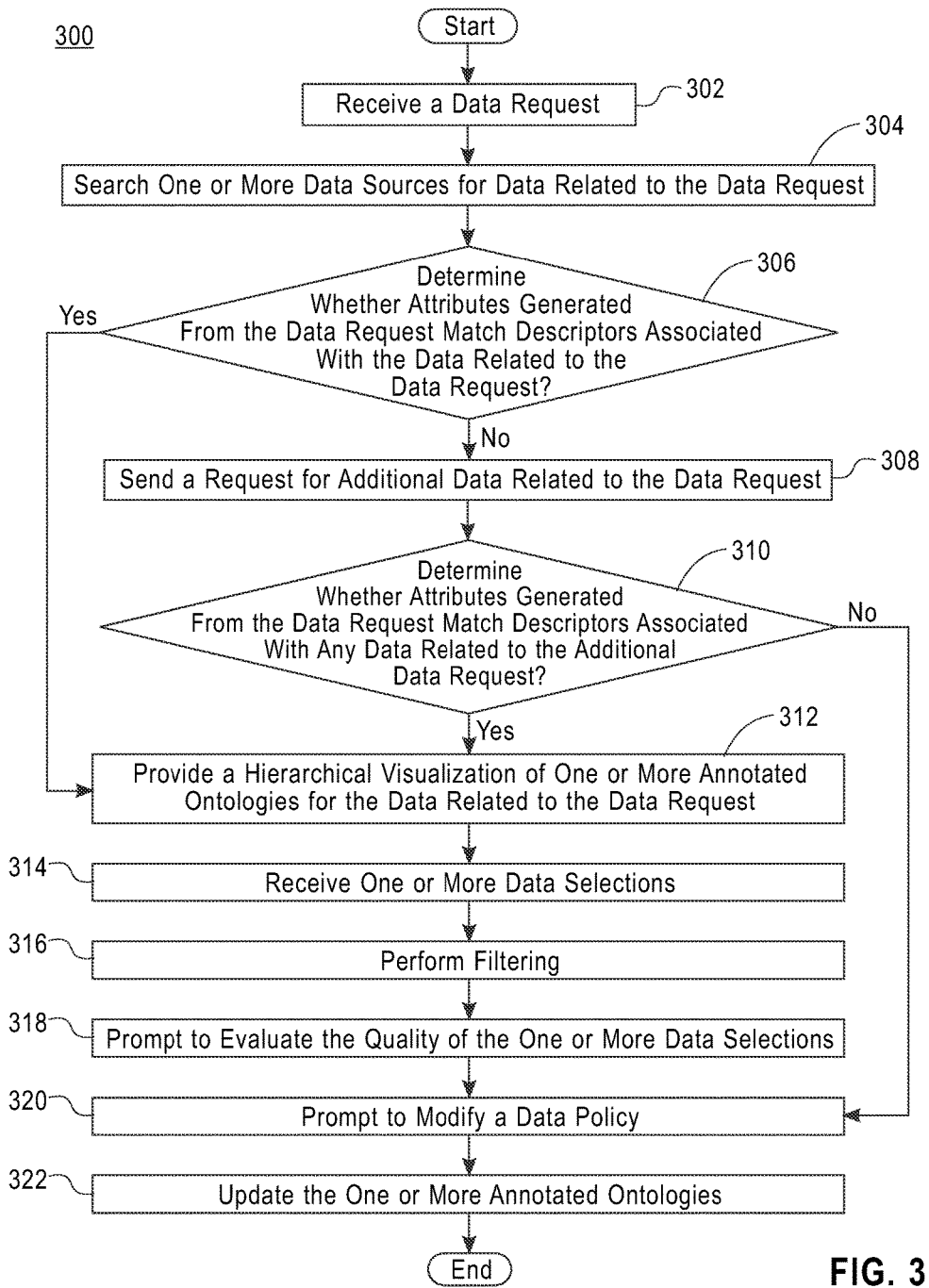
FIG. 3 is a flowchart depicting the operational steps of a data service, generally designated 300, for policy based data collection and preprocessing for analytics, in accordance with an embodiment of the present invention.

FIG. 3 is a flowchart depicting the operational steps of a data service, such as data service 106 of FIG. 1, generally designated 300, for data selection and negotiation, in accordance with an embodiment of the present invention.

Data service 106 receives a data request (302). In the exemplary embodiment, data service 106 receives a data request from a data consumer, such as data consumer 112, where the data request includes data that the data consumer is interested in for a particular analytic solution. In the exemplary embodiment, data service 106 receives the data request via a user interface, such as user interface 108, or an application program interface (API), where the data request can be in a natural language format or a structured format, etc. For example, data service 106 receives a data request from a data consumer, such as data consumer 112, where the data request specifies data needed for a particular analytic solution, such as an end user administrator or service providers interested in dynamically analyzing their operation and business data for benefiting customers with augmented visibility into the business.

Data service 106 searches one or more data sources for data related to the data request (304). In the exemplary embodiment, data service 106 searches one or more data sources for available data related to the data request by generating attributes from the data request and searching the one or more data sources for available data related to the attributes (i.e., the data consumer's data requirements). In the exemplary embodiment, the one or more data sources can include, without limitation, data streams, server databases, the internet, one or more data providers, such as data provider 110, cloud service providers, data mining engines, and any other suitable data sources capable of providing data to a data consumer. In the exemplary embodiment, data service 106 generates attributes from the data request by determining one or more attributes that describe and identify data requirements requested in the data request, where the one or more attributes can include, without limitation, a keyword, a topic, a phrase, a file type, a file size, a domain specific descriptor, a collection of system data, a plurality of statistics, a plurality of consumer information, a plurality of employee information, and any other suitable attributes capable of describing and identifying available data related to a data consumer's data requirements.

Data service 106 determines whether attributes generated from the data request match descriptors associated with the data related to the data request (306). In the exemplary embodiment, data service 106 determines whether attributes generated from the data request match descriptors associated with available data related to the data request, such as descriptors in the data descriptor template of FIG. 2, by extracting one or more features of the available data provided by the one or more data sources (i.e., data descriptors), and comparing the one or more features against the attributes generated from the data request. Where at least one of the one or more features of the available data are related to at least one of the attributes generated from the data request, data service 106 determines that attributes generated from the data request match descriptors associated with the data related to the data request. Where the one or more features of the available data are not related to at least one of the attributes generated from the data request, data service 106 determines that attributes generated from the data request do not match descriptors associated with the data related to the data request.

In response to a determination that attributes generated from the data request match descriptors associated with the data related to the data request (YES branch, 306), data service 106 provides a hierarchical visualization of one or more annotated ontologies for the data related to the data request (312). In the exemplary embodiment, data service 106 provides a hierarchical visualization of one or more annotated ontologies for the data related to the data request, such as the one or more annotated ontologies created by ontology engine 206 utilizing the operational steps of flowchart 400 depicted in FIG. 4, by displaying the hierarchical visualization of the annotated one or more ontologies to a data consumer, such as data consumer 112, via a user interface, such as user interface 108(a), where the hierarchical visualization of the one or more annotated ontologies for the data related to the data request includes ontology descriptors organized in a hierarchy. In the exemplary embodiment, the one or more annotated ontologies are annotated with summaries of one or more documents from the data related to the data request, and the annotations conform to one or more modifiable policy rules (i.e., data provider policy rules and data consumer policy rules) for handling the data. In the exemplary embodiment, data service 106 displays the hierarchical visualization via a user interface, such as user interface 108(a), to allow a data consumer, such as data consumer 112, to investigate different exposed aspects of the data and make data selections based on data requirements for a particular analytic solution. The operational steps of data service 106 for creating one or more annotated ontologies for the data related to the data request is discussed in further detail in FIG. 4.

In response to a determination that attributes generated from the data request do not match descriptors associated with the data related to the data request (NO branch, 306), data service 106 sends a request for additional data related to the data request (308). In the exemplary embodiment, data service 106 sends a request for additional data related to the data request to the one or more data sources to evaluate the availability of any additional data related to the data request. In one embodiment, data service 106 may receive a notification from the one or more data sources that additional data related to the data request is available. In another embodiment, data service 106 may receive a notification from the one or more data sources that no additional data related to the data request is available.

Data service 106 determines whether attributes generated from the data request match descriptors associated with any additional data related to the data request (310). In the exemplary embodiment, responsive to availability of any additional data related to the data request, data service 106 determines whether attributes generated from the data request match descriptors associated with any additional data related to the data request by extracting one or more features of the additional data provided by the one or more data sources (i.e., data descriptors), and comparing the one or more features against the attributes generated from the data request. Where at least one of the one or more features of any additional data are related to at least one of the attributes generated from the data request, data service 106 determines that attributes generated from the data request match descriptors associated with the additional data related to the data request. Where the one or more features of any additional data are not related to at least one of the attributes generated from the data request, data service 106 determines that attributes generated from the data request do not match descriptors associated with any additional data related to the data request.

In the response to a determination that attributes generated from the data request do not match descriptors associated with the additional data related to the data request (NO branch, 310), data service 106 prompts to modify a data policy (320). In the exemplary embodiment, data service 106 prompts a data consumer, such as data consumer 112, to modify an existing data policy via a user interface, such as user interface 108(a), to facilitate an enhanced return on available data related to the data request. For example, data service 106 may prompt a data consumer to modify a data policy by broadening a type of data requested in a data request by adding additional criteria, or modify the data policy by specifying less restrictive data requirements. In one embodiment, data service 106 prompts a data provider, such as data provider 110, to modify an existing data policy via a user interface, such as user interface 108(b), to increase the quality and quantity of available data related to a data request. In one embodiment, responsive to a data consumer, such as data consumer 112, modifying an existing data policy via a user interface, such as user interface 108(a), data service 106 may search one or more data sources for data related to the data request (304). In one embodiment, responsive to a data provider, such as data provider 110, modifying an existing data policy via a user interface, such as user interface 108(b), data service 106 may search one or more data sources for data related to the data request (304). In one embodiment, responsive to a data consumer, such as data consumer 112, modifying an existing data policy via a user interface, such as user interface 108(a), data service 106 may store the updated data policy in a database to be leveraged by an ontology engine, such as ontology engine 206, for creating one or more annotated ontologies utilizing the operational steps depicted in flowchart 400 of FIG. 4. In one embodiment, responsive to a data provider, such as data provider 110, modifying an existing data policy via a user interface, such as user interface 108(b), data service 106 may store the updated data policy in a database to be leveraged by an ontology engine, such as ontology engine 206, for creating one or more annotated ontologies utilizing the operational steps depicted in flowchart 400 of FIG. 4.

In response to a determination that attributes generated from the data request match descriptors associated with the additional data related to the data request (YES branch, 310), data service 106 provides a hierarchical visualization of one or more annotated ontologies for the data related to the data request (312). In the exemplary embodiment, data service 106 provides a hierarchical visualization of one or more annotated ontologies for the data related to the data request, such as the one or more annotated ontologies created by ontology engine 206 utilizing the operational steps of flowchart 400 depicted in FIG. 4, where the hierarchical visualization of one or more annotated ontologies for the data related to the data request includes ontology descriptors organized in a hierarchy, where one or more annotated ontologies are annotated with summaries of one or more documents from the data related to the data request, and the annotations conform to one or more modifiable policy rules (i.e., data provider policy rules and data consumer policy rules) for handling the data. In the exemplary embodiment, data service 106 provides the hierarchical visualization via a user interface, such as user interface 108(a), to allow a data consumer, such as data consumer 112, to investigate different exposed aspects of the data and make data selections based on data requirements for a particular analytic solution.

Data service 106 receives one or more data selections (314). In the exemplary embodiment, data service 106 receives one or more data selections from data provided in the hierarchical visualization of the one or more annotated ontologies for the data related to the data request. In the exemplary embodiment, data service 106 receives the one or more data selections from input from a data consumer, such as data consumer 112, via a user interface, such as user interface 108(a).

Data service 106 performs filtering (316). In the exemplary embodiment, data service 106 performs filtering of the data from the one or more annotated ontologies for the data related to the data request utilizing a data filter, such as data filter 208 of FIG. 2. In the exemplary embodiment, data service 106 filters data from the one or more annotated ontologies for the data related to the data request based, at least in part, on the data consumer's data selections, a data consumer data policy, and a data provider data policy, to generate a subset of data based on a data policy and various preferences of a data consumer and data provider, such as data consumer 112 and data provider 110. In the exemplary embodiment, data service 106 cleans the data from the one or more annotated ontologies by applying modifiable data policy rules, such as the one or more user defined policy rules received in flowchart 400 of FIG. 4, from a data consumer data policy, a data provider data policy, or both, to ensure the data selections conform to data policy rules. For example, types of modifiable data policy rules may include prevention from association based on privilege and security, partial deletion or redaction, IF-THEN conditions, and aggregation of information, etc. In one embodiment, in response to filtering the data from the one or more ontologies for the data related to the data request (i.e., data selections comply with modifiable data policy rules), data service 106 provides conforming data to the data consumer.

Data service 106 prompts to evaluate the quality of the one or more data selections (318). In the exemplary embodiment, data service 106 prompts a data consumer, such as data consumer 112, to evaluate the quality of the one or more data selections (i.e., the provided data), where an evaluation of the quality of the one or more data selections can include, without limitation, ranking data source credibility, ranking data source prestige, ranking data source relevance to a particular domain, effectiveness of a data policy, and ranking the ratio of data updated by filtering. In one embodiment, evaluating may include ranking the one or more data sources (i.e., data providers) by a type, a quality, and a quantity of data provided. In one embodiment, data service 106 stores the evaluation of the quality of the one or more data selections in a database (not shown), such that data service 106 may utilize the evaluation as historical data for updating the one or more annotated ontologies.

Data service 106 prompts to modify a data policy (320). In the exemplary embodiment, data service 106 prompts a data consumer, such as data consumer 112, to modify an existing data policy to facilitate an enhanced return on available data related to the data request. For example, data service 106 may prompt a data consumer to modify a data policy by broadening a type of data requested in a data request by adding additional criteria, or modify the data policy by specifying less restrictive data requirements. In another embodiment, data service 106 may prompt a data provider, such as data provider 110, to modify an existing data policy to facilitate better evaluations and increase data consumer activity. For example, based on past evaluations of data quality and data quantity, a data provider may modify data policy rules to allow for less restriction on data being provided.

Data service 106 updates the one or more annotated ontologies (322). In the exemplary embodiment, data service 106 updates the one or more annotated ontologies based, at least in part, on historical data related to past data policies' impact on provided data, feedback on how the data was used by a data consumer for a particular analytic solution, and various rankings of data sources and provided data.

Figure 4:
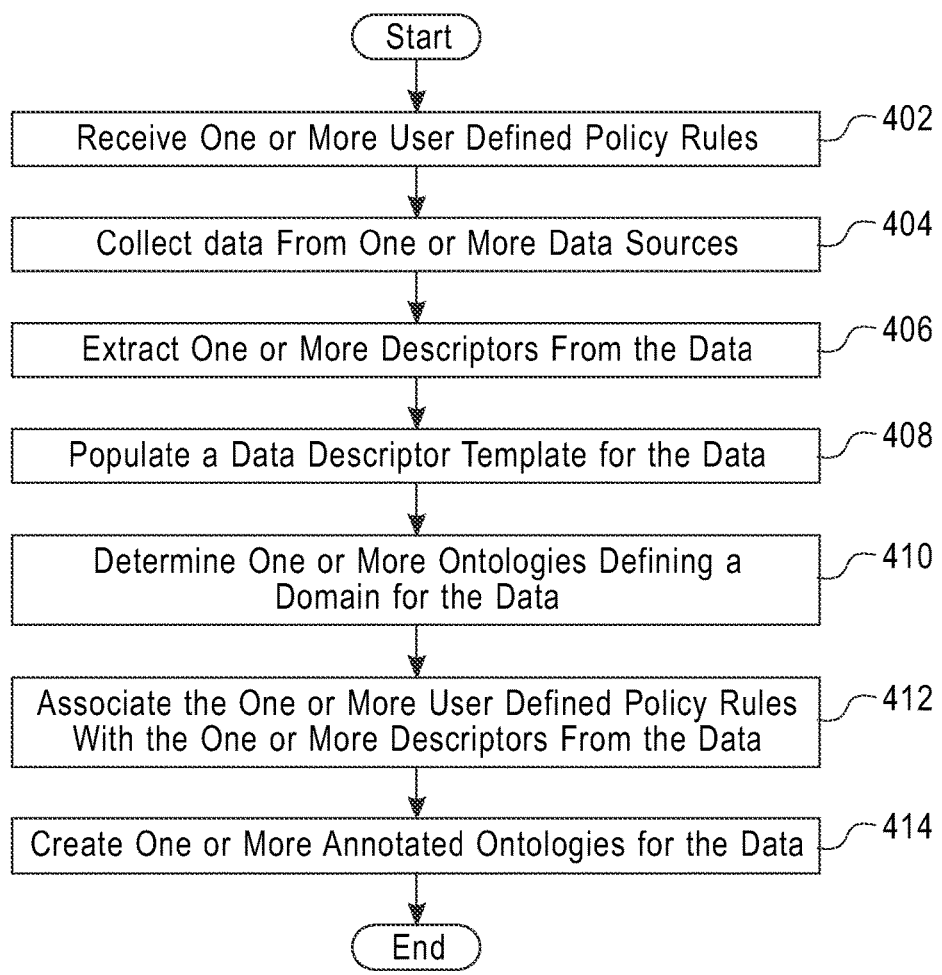
FIG. 4 is a flowchart depicting the operational steps of a data service, generally designated 400, for displaying a hierarchical visualization of one or more annotated ontologies, in accordance with an embodiment of the present invention.

FIG. 4 is a flowchart depicting the operational steps of a data service, such as data service 106 of FIG. 1, generally designated 400, for displaying a hierarchical visualization of one or more annotated ontologies, in accordance with an embodiment of the present invention.

Data service 106 receives one or more user defined policy rules (402). In the exemplary embodiment, data service 106 receives one or more user defined policy rules, where the user defined policy rules are modifiable data policy rules for handling collection, preprocessing, dissemination, and selection of data. For example, user defined policy rules may include rules relevant to data privacy, data cost, data topology, and quantity of data, data characteristics, etc. In another example, user defined policy rules may dictate how data is handled with respect to constraints, synonyms, dependencies, etc. In the exemplary embodiment, the user defined policy rules are modifiable, such that a data consumer, such as data consumer 112, and a data provider, such as data provider 110, can refine the data policy rules to meet various needs. For example, a data provider, such as data provider 110, may modify user defined policy rules to further restrict the type and quantity of sensitive data collected for dissemination to a data consumer, such as data consumer 112, while broadening the type and quantity of less sensitive data collected for dissemination.

Data service 106 collects data from one or more data sources (404). In the exemplary embodiment, data service 106 collects data from one or more data sources, where data sources include, without limitation, a database, a data stream, a plurality of files, a plurality of documents, and a data mining service, etc. In the exemplary embodiment, data provider 110 can include one or more data sources. In the exemplary embodiment, data service 106 collects data based, at least in part, on a data request from a data consumer, such as data consumer 112.

Data service 106 extracts one or more descriptors from the data (406). In the exemplary embodiment, data service 106 extracts one or more descriptors from the data (i.e., collected data), where the one or more data descriptors function to describe and identify the collected data. For example, data service 106 may extract features from collected (i.e., available) data based on headers, typical regular expressions, internet protocol (IP) addresses, and logs, etc.

Data service 106 populates a data descriptor template for the data (408). In the exemplary embodiment, data service 106 populates a data descriptor template, such as the data descriptor template of FIG. 2, for the data with the one or more descriptors extracted from the data. Data service 106 employs automatic data tagging based, at least in part, on a given domain ontology, a particular set of data (i.e., collected data), and a data provider data policy.

Data service 106 determines one or more ontologies defining a domain for the data (410). In the exemplary embodiment, data service 106 determines one or more ontologies defining a domain for the data by discovering relevant ontology descriptors and associating the relevant ontology descriptors with related data descriptors from the collected data. For example, where data service 106 extracts a data descriptor "social security number", data service 106 may discover relevant ontological descriptors, such as "SSN", associate the relevant ontology descriptors with the related data descriptor "social security number", and then determine one or more ontologies defining a domain for data related to social security numbers.

Data service 106 associates the one or more user defined policy rules with the one or more descriptors from the data (412). In the exemplary embodiment, data service 106 associates the one or more user defined policy rules with the one or more descriptors from the data by determining a level of relevancy between policy rules and data descriptors. For example, where a user defined policy includes rules related to sensitive and confidential patient information, data service 106 may determine a high relevance between those rules and collected data that includes patient health records, social security numbers, addresses, and contact information, etc. In response to a determination of a relevance between policy rules and data descriptors, data service 106 associates the one or more user defined policy rules with the one or more descriptors from the data for managing the retention, aggregation, and pruning of the data.

Data service 106 creates one or more annotated ontologies for the data (414). In the exemplary embodiment, data service 106 creates one or more annotated ontologies for the data by combining ontologies defining a domain for the data and concept related policy (i.e., user defined data policy rules) to describe the data and various handling requirements (e.g., synonyms, dependencies, constraints, privacy rules, etc.) depending on those concept related polices. For example, data service 106 may create an annotated ontology for data related to rates of healthcare incidents, where the annotated ontology may include data related to a type of healthcare incident (e.g., ER, trauma, oncology, checkup, etc.), but will exclude patient data (e.g., social security number, name, address, etc.) based on defined policy rules. In the exemplary embodiment, each of the one or more annotated ontologies defines a domain for the collected data through a hierarchical organization of the one or more data descriptors for the data. In the exemplary embodiment, data service 106 annotates the one or more data descriptors with at least one summary of one or more documents collected from the data sources (i.e., collected data), such that the data is presented in a dynamic, flexible, and interactive format. In the exemplary embodiment, annotating the one or more data descriptors with the at least one summary includes associating summary information from searching one or more data sources, applying data policy rules to the at least one summary, and modifying the at least one summary to conform to relevant data policy rules. In the exemplary embodiment, the annotations conform to the user defined data policy rules. In the exemplary embodiment, the one or more annotated ontologies are stored in one or more of memories within a server, such as server 104, and can be provided to a data consumer, such as data consumer 112, by displaying the one or more annotated ontologies in a hierarchical visualization via a user interface, such as user interface 108(*a*).

Figure 5:
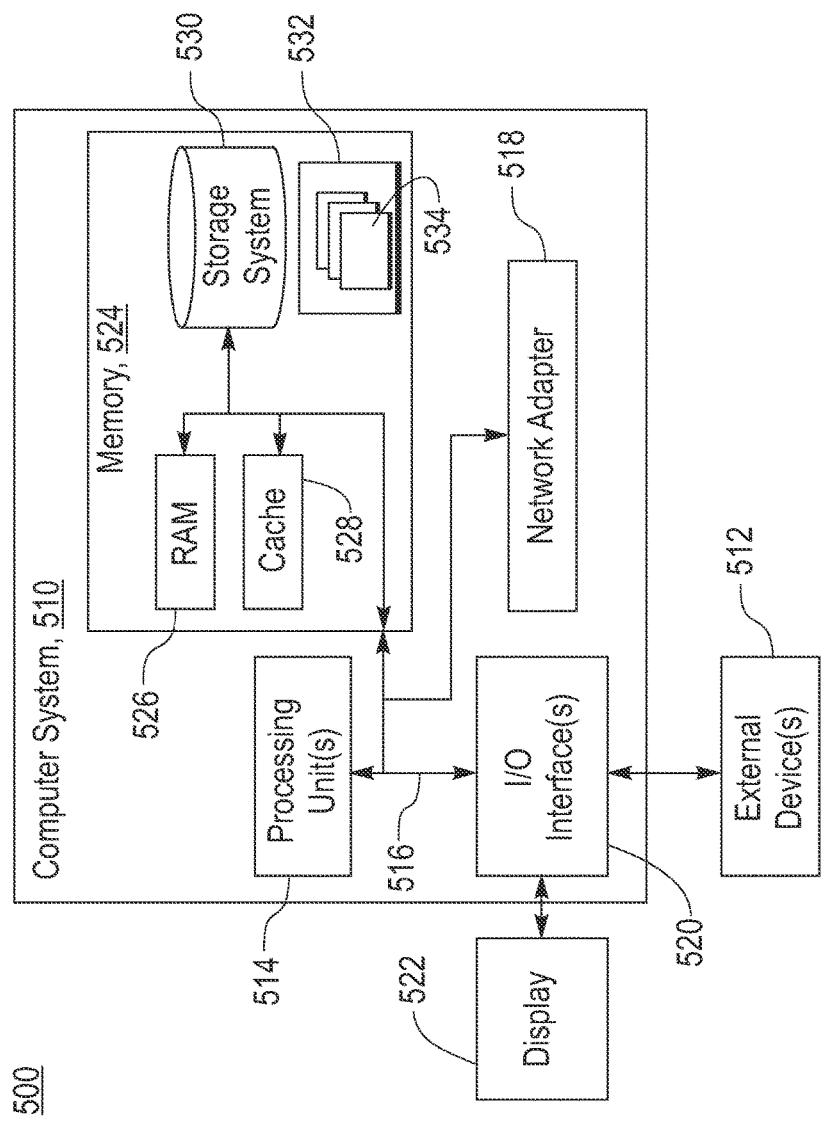
FIG. 5 depicts a schematic of an example of a cloud computing node, generally designated 500, in accordance with an embodiment of the present invention.

FIG. 5 depicts a block diagram of components of a data processing system, generally designated 500, in data processing environment 100, such as server 104, in accordance with an illustrative embodiment of the present invention. It should be appreciated that FIG. 5 provides only an illustration of one implementation and does not imply any limitations with regard to the environments in that different embodiments may be implemented. Many modifications to the depicted environment can be made. In an embodiment, data processing system 500 is a cloud computing node, and is only one example of a suitable cloud computing node and is not intended to suggest any limitation as to the scope of use or functionality of embodiments of the invention described herein. Regardless, data processing system 500 is capable of being implemented and/or performing any of the functionality set forth hereinabove.

In the illustrative embodiment, computer system 510 in data processing environment 100 is shown in the form of a general-purpose computing device, such as server 104. The components of computer system 510 may include, but are not limited to, one or more processors or processing unit(s) 514, memory 524, and bus 516 that couples various system components including memory 524 to processing unit(s) 514. Computer system 510 may be described in the general context of computer system-executable instructions, such as program modules, being executed by a computer system. Generally, program modules may include routines, programs, objects, components, logic, data structures, and so on that perform particular tasks or implement particular abstract data types. Computer system 510 may be practiced in distributed cloud computing environments where tasks are performed by remote processing devices that are linked through a communications network. In a distributed cloud computing environment, program modules may be located in both local and remote computing system storage media including memory storage devices.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external device(s) 512 such as a keyboard, a pointing device, a display 522, etc., or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

Figure 6:
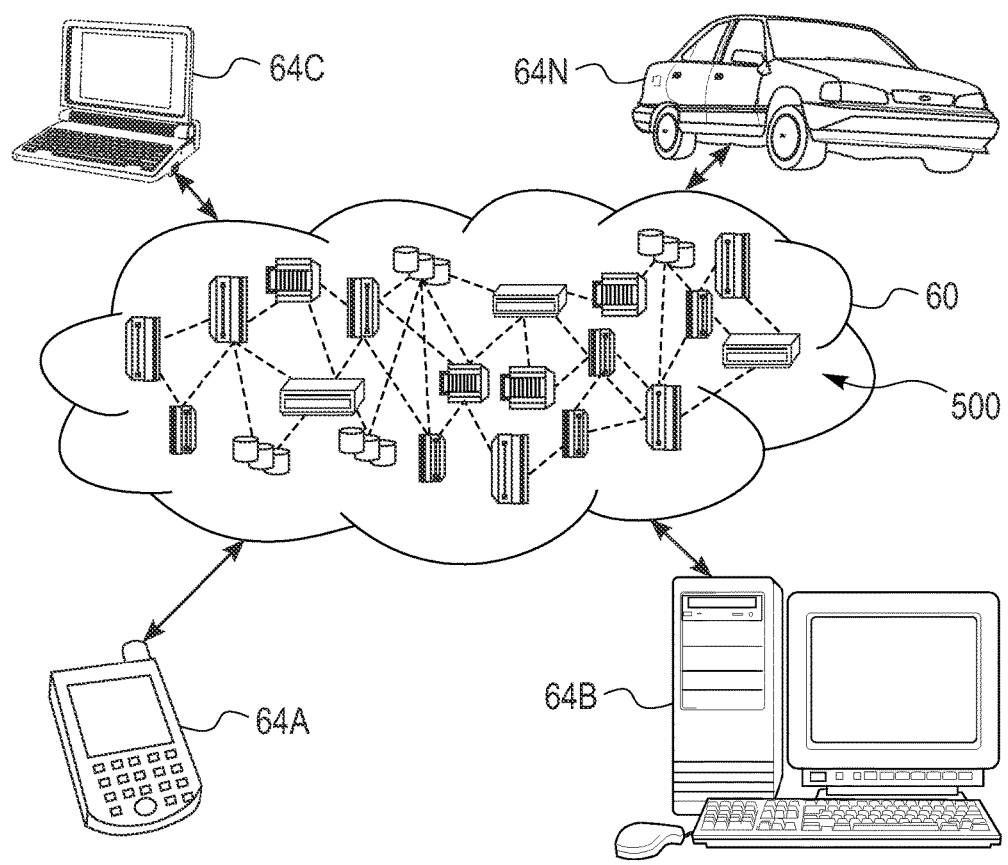
FIG. 6 depicts an illustrative cloud computing environment, generally designated 600, in accordance with an embodiment of the present invention.

FIG. 6 depicts illustrative cloud computing environment 60, in accordance with an embodiment of the present invention. As shown, cloud computing environment 60 comprises one or more cloud computing nodes 500 with which local computing devices used by cloud consumers, such as, for example, personal digital assistant (PDA) or cellular telephone 64A, desktop computer 64B, laptop computer 64C, and/or automobile computer system 64N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 5 are intended to be illustrative only and that computing nodes 500 and cloud computing environment 60 can communicate with any type of computerized device over any type of network and/or network addressable connection (e.g., using a web browser).

Figure 7:
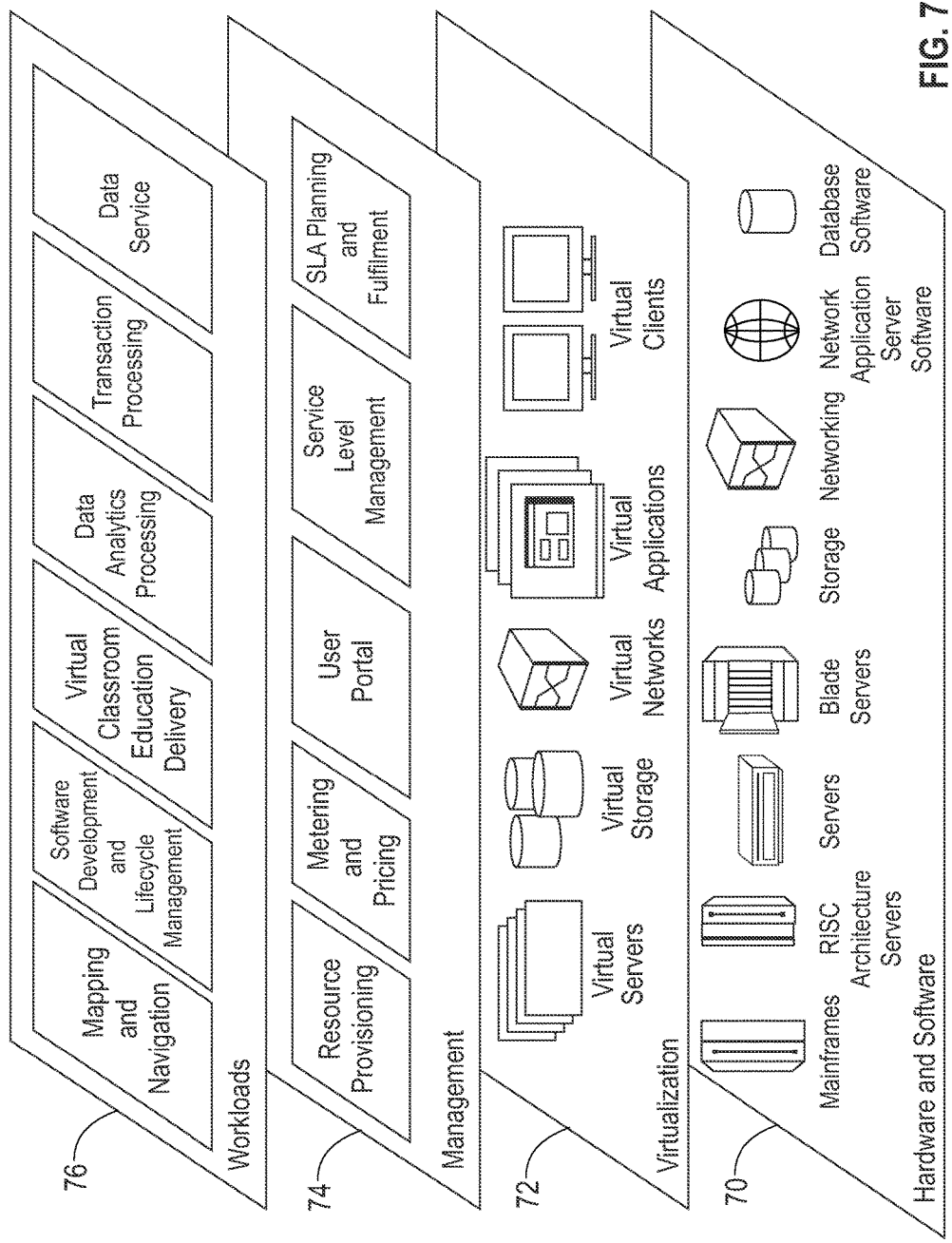
FIG. 7 depicts a set of functional abstraction layers provided by a cloud computing environment, generally designated 700, in accordance with an embodiment of the present invention.

FIG. 7 depicts a set of functional abstraction layers provided by cloud computing environment 60, in accordance with an embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 70 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 72 provides an abstraction layer from which the following examples of virtual entities may be provided: virtual servers; virtual storage; virtual networks, including virtual private networks; virtual applications and operating systems; and virtual clients.

In one example, management layer 74 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 76 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

The invention claimed is:

1. A method for improving data collection and analytics utilizing off-line data auto-tagging and on-line fine granularity data tagging based on negotiations between a data provider and a data consumer, the method comprising:
receiving, by one or more computer processors, a data request from the data consumer;
generating, by one or more computer processors, one or more attributes from the data request;
searching, by one or more computer processors, one or more data sources for data related to the one or more attributes;
collecting, by one or more computer processors, data related to the one or more attributes from the one or more data sources, wherein collecting the data related to the one or more attributes includes populating a data descriptor template for the data related to the one or more attributes with one or more descriptors;
determining, by one or more computer processors, whether the collected data match the one or more descriptors;
responsive to a determination that the collected data match the one or more descriptors, creating, by one or more computer processors, one or more annotated ontologies for the collected data by combining one or more ontologies defining a domain for the collected data with one or more modifiable data policy rules to describe the data and one or more handling requirements for the collected data based on the one or more modifiable data policy rules, wherein creating the one or more annotated ontologies includes annotating the one or more descriptors in the data descriptor template with at least one summary of one or more documents from the collected data, wherein annotating the one or more descriptors with the at least one summary includes associating summary information generated from searching the one or more data sources, applying data policy rules to the at least one summary, and modifying the at least one summary to conform to relevant data policy rules related to data cost, data topology and quantity of data;
providing, by one or more computer processors, a hierarchical visualization of the one or more annotated ontologies for the collected data to the data consumer;
receiving, by one or more computer processors, one or more data selections from the one or more annotated ontologies; and
updating, by one or more computer processors, the one or more annotated ontologies for the collected data based, at least in part, on a quality evaluation of the one or more data selections.

2. The method of claim 1, wherein collecting the data related to the one or more attributes, further comprises:
extracting, by one or more computer processors, the one or more descriptors from the data related to the one or more attributes, wherein the one or more descriptors describe and identify the data; and
determining, by one or more computer processors, one or more ontologies defining a domain for the data related to the one or more attributes.

3. The method of claim 2, wherein determining one or more ontologies defining a domain for the data related to the one or more attributes, further comprises:
discovering, by one or more computer processors, one or more relevant ontology descriptors; and
associating, by one or more computer processors, the one or more relevant ontology descriptors with one or more descriptors from the data related to the one or more attributes.

4. The method of claim 1, wherein determining whether the collected data match one or more descriptors, further comprises at least one of:
determining, by one or more computer processors, that the one or more attributes generated from the data request match the one or more descriptors associated with the collected data where at least one of one or more features of the collected data are related to at least one of the one or more attributes generated from the data request; and
determining, by one or more computer processors, that the one or more attributes generated from the data request do not match the one or more descriptors associated with the collected data where at least one of one or more features of the collected data are not related to at least one of the one or more attributes generated from the data request.

5. The method of claim 1, wherein providing a hierarchical visualization of one or more ontologies for the collected data, further comprises:
associating, by one or more computer processors, one or more user defined policy rules with one or more descriptors from the collected data, wherein associating the one or more user defined policy rules with one or more descriptors for the collected data includes determining a level of relevancy between policy rules and data descriptors.

6. The method of claim 1, further comprises:
filtering, by one or more computer processors, data from the one or more ontologies for the collected data, at least in part, on the one or more data selections, a data consumer data policy, and a data provider data policy, wherein filtering includes cleaning data from the one or more ontologies by applying one or more modifiable data policy rules from the data consumer data policy and the data provider data policy.

7. The method of claim 1, wherein updating the one or more ontologies for the collected data based, at least in part, on a quality evaluation of the quality of the one or more data selections, further comprises:
prompting, by one or more computer processors, the quality evaluation of the one or more data selections, wherein the quality evaluation of the one or more data selections include at least one of ranking a data source credibility, ranking a data source prestige, ranking a data source relevance to a particular domain, and ranking a ratio of data updated based on data filtering; and
prompting, by one or more computer processors, to modify an existing data policy.

8. A computer program product for improving data collection and analytics utilizing off-line data auto-tagging and on-line fine granularity data tagging based on negotiations between a data provider and a data consumer, the computer program product comprising:
one or more computer readable storage media and program instructions stored on the one or more computer readable storage media, the program instructions comprising:
program instructions to receive, by one or more computer processors, a data request from the data consumer;
program instructions to generate, by one or more computer processors, one or more attributes from the data request;
program instructions to search, by one or more computer processors, one or more data sources for data related to the one or more attributes;
program instructions to collect, by one or more computer processors, data related to the one or more attributes from the one or more data sources, wherein collecting the data related to the one or more attributes includes populating a data descriptor template for the data related to the one or more attributes with one or more descriptors;
program instructions to determine, by one or more computer processors, whether the collected data match one or more descriptors;
responsive to a determination that the collected data match the one or more descriptors, program instructions to create, by one or more computer processors, one or more annotated ontologies for the collected data by combining one or more ontologies defining a domain for the collected data with one or more modifiable data policy rules to describe the data and one or more handling requirements for the collected data based on the one or more modifiable data policy rules, wherein creating the one or more annotated ontologies includes annotating the one or more descriptors in the data descriptor template with at least one summary of one or more documents from the collected data, wherein annotating the one or more descriptors with the at least one summary includes associating summary information generated from searching the one or more data sources, applying data policy rules to the at least one summary, and modifying the at least one summary to conform to relevant data policy rules related to data cost, data topology and quantity of data;
program instructions to provide, by one or more computer processors, a hierarchical visualization of the one or more annotated ontologies for the collected data to the data consumer;
program instructions to receive, by one or more computer processors, one or more data selections from the one or more annotated ontologies; and
program instructions to update, by one or more computer processors, the one or more annotated ontologies for the collected data based, at least in part, on a quality evaluation of the one or more data selections.

9. The computer program product of claim 8, wherein program instructions to determine whether the collected data match one or more descriptors, further comprises at least one of:
program instructions to determine, by one or more computer processors, that the one or more attributes generated from the data request match the one or more descriptors associated with the collected data where at least one of one or more features of the collected data are related to at least one of the one or more attributes generated from the data request; and
program instructions to determine, by one or more computer processors, that the one or more attributes generated from the data request do not match the one or more descriptors associated with the collected data where at least one of one or more features of the collected data are not related to at least one of the one or more attributes generated from the data request.

10. The computer program product of claim 8, wherein program instructions to provide a hierarchical visualization of one or more ontologies for the collected data, further comprises:
program instructions to associate, by one or more computer processors, one or more user defined policy rules with one or more descriptors from the collected data, wherein associating the one or more user defined policy rules with one or more descriptors for the collected data includes determining a level of relevancy between policy rules and data descriptors.

11. The computer program product of claim 8, further comprises:
program instructions to filter, by one or more computer processors, data from the one or more ontologies for the collected data, at least in part, on the one or more data selections, a data consumer data policy, and a data provider data policy, wherein filtering includes cleaning data from the one or more ontologies by applying one or more modifiable data policy rules from the data consumer data policy and the data provider data policy.

12. The computer program product of claim 8, wherein program instructions to update the one or more ontologies for the collected data based, at least in part, on a quality evaluation of the one or more data selections, further comprises:
program instructions to prompt, by one or more computer processors, the quality evaluation of the one or more data selections, wherein the quality evaluation of the one or more data selections include at least one of ranking a data source credibility, ranking a data source prestige, ranking a data source relevance to a particular domain, and ranking a ratio of data updated based on data filtering; and program instructions to prompt, by one or more computer processors, to modify an existing data policy.

13. A computer system for ontological policy based data collection, processing, and negotiation for data in view of analytics, the computer system comprising:

one or more hardware computer processors;
one or more computer readable storage media;
program instructions stored on at least one of the one or more computer readable storage media for execution by at least one of the one or more hardware computer processors, the program instructions comprising:
program instructions to receive, by one or more hardware computer processors, a data request from the data consumer;
program instructions to generate, by one or more hardware computer processors, one or more attributes from the data request;
program instructions to search, by one or more hardware computer processors, one or more data sources for data related to the one or more attributes;
program instructions to collect, by one or more hardware computer processors, data related to the one or more attributes from the one or more data sources, wherein collecting the data related to the one or more attributes includes populating a data descriptor template for the data related to the one or more attributes with one or more descriptors;
program instructions to determine, by one or more hardware computer processors, whether the collected data match one or more descriptors;
responsive to a determination that the collected data match the one or more descriptors, program instructions to create, by one or more hardware computer processors, one or more annotated ontologies for the collected data by combining one or more ontologies defining a domain for the collected data with one or more modifiable data policy rules to describe the data and one or more handling requirements for the collected data based on the one or more modifiable data policy rules, wherein creating the one or more annotated ontologies includes annotating the one or more descriptors in the data descriptor template with at least one summary of one or more documents from the collected data, wherein annotating the one or more descriptors with the at least one summary includes associating summary information generated from searching the one or more data sources, applying data policy rules to the at least one summary, and modifying the at least one summary to conform to relevant data policy rules related to data cost, data topology and quantity of data;

program instructions to provide, by one or more hardware computer processors, a hierarchical visualization of the one or more annotated ontologies for the collected data to the data consumer;

program instructions to receive, by one or more hardware computer processors, one or more data selections from the one or more annotated ontologies; and program instructions to update, by one or more hardware computer processors, the one or more annotated ontologies for the collected data based, at least in part, on a quality evaluation of the one or more data selections.

14. The computer system of claim 13, wherein program instructions to provide a hierarchical visualization of one or more ontologies for the collected data, further comprises:

program instructions to associate, by one or more hardware computer processors, one or more user defined policy rules with one or more descriptors from the collected data, wherein associating the one or more user defined policy rules with one or more descriptors for the collected data includes determining a level of relevancy between policy rules and data descriptors.

15. The computer system of claim 13, further comprises:

program instructions to filter, by one or more hardware computer processors, data from the one or more ontologies for the collected data, at least in part, on the one or more data selections, a data consumer data policy, and a data provider data policy, wherein filtering includes cleaning data from the one or more ontologies by applying one or more modifiable data policy rules from the data consumer data policy and the data provider data policy.

16. The computer system of claim 13, wherein program instructions to update the one or more ontologies for the collected data based, at least in part, on a quality evaluation of the one or more data selections, further comprises:

program instructions to prompt, by one or more hardware computer processors, the quality evaluation of the one or more data selections, wherein the quality evaluation of the one or more data selections include at least one of ranking a data source credibility, ranking a data source prestige, ranking a data source relevance to a particular domain, and ranking a ratio of data updated based on data filtering; and program instructions to prompt, by one or more hardware computer processors, to modify an existing data policy.

* * * * *